March 20, 1956 R. C. KRAEGER 2,738,614
FLY LARVAE DESTROYER
Filed May 11, 1953
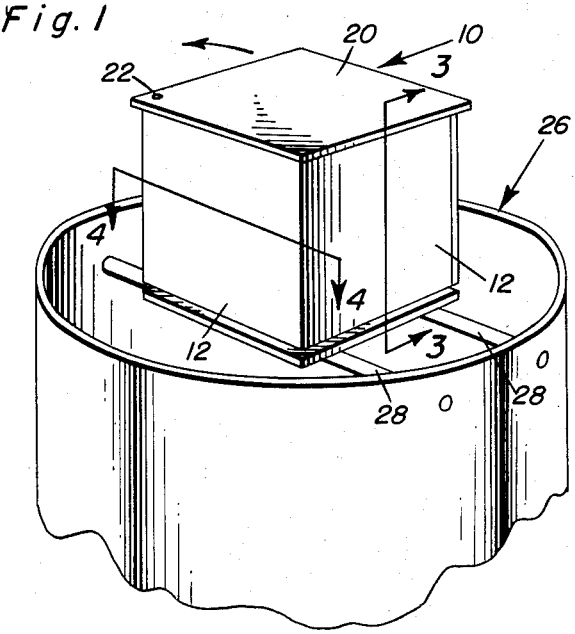
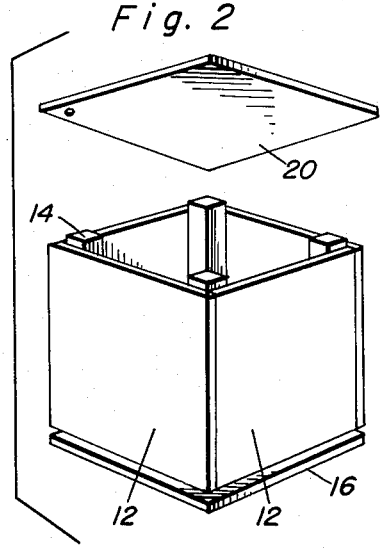
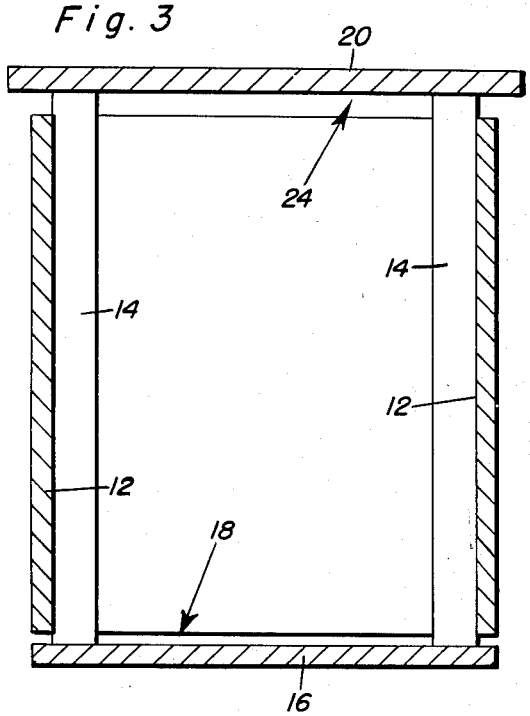
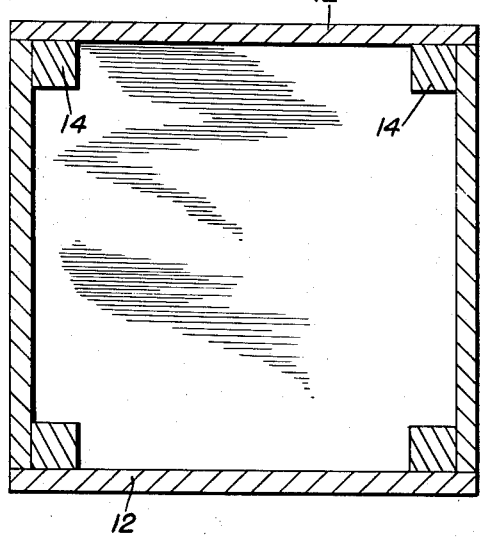
Robert Charles Kraeger
INVENTOR.

United States Patent Office 2,738,614
Patented Mar. 20, 1956

2,738,614

FLY LARVAE DESTROYER

Robert Charles Kraeger, Port Leyden, N. Y.

Application May 11, 1953, Serial No. 354,067

1 Claim. (Cl. 43—131)

This invention relates generally to insect traps and pertains more particularly to means for destroying fly larvae.

A primary object of this invention is to provide a breeding place for flies so that their larvae may be destroyed prior to their generation into the adult stage.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective view of the fly larvae destroyer in operative position;

Figure 2 is an exploded view of the fly larvae destroyer;

Figure 3 is an enlarged vertical section taken substantially along the plane of section line 3—3 of Figure 1 showing details of the internal construction; and Figure 4 is an enlarged horizontal section taken substantially along the plane of section line 4—4 of Figure 1 showing further details of internal construction.

Referring now more particularly to the drawings, reference numeral 10 indicates generally a fly housing or receptacle which includes a plurality of side walls 12 disposed in angulated relation as shown to form a rectangular member. Each corner of the assembly thus formed is provided with a corner post 14 whose upper and lower edges, respectively, extend above and below the free edges of the side walls in the manner most clearly seen in Figure 3. A bottom 16 is firmly secured to the lower ends of the corner posts so that the same is positioned in spaced relation to the lower free edges of the side walls to provide the opening 18 therebetween for a purpose presently apparent. A top wall 20 is disposed in overlying relation to the upper ends of the corner posts and is secured to one of these posts by the fastening element 22 so that the top may be pivotally manipulated with respect to the remainder of the receptacle to provide access to the interior thereof, the top being spaced above the upper edges of the side walls to provide the opening 24.

In order to most effectively utilize the construction shown, a suitable receptacle 26, such as a barrel or the like, is partially filled with oil or similar larvae destroying solutions and its upper end is provided with suitable support rods 28 upon which the bottom wall 16 of the fly receptacle is placed. Into the interior of the fly receptacle, the user may pack refuse or garbage, such as the entrails of fowl or the like, and the entire assembly is preferably placed at some distance away from dwellings. The purpose of the entire construction is to provide a breeding spot which is most attractive to flies so that these insects will be enticed to lay their eggs within the confines of the fly receptacle, the insects gaining access to the interior thereof through the opening 24 at the top edge of the eliminator. After the eggs have been laid and are hatched, the resulting larvae will feed upon the garbage or refuse disposed within the receptacle and will eventually work their way down through the interior of the receptacle to fall outwardly thereof through the bottom opening 18 into the barrel 26 containing oil or other chemicals having properties for destroying the larvae. In this manner, the insect larvae will never reach the adult stage, and the number of flies developed from the larvae is thereby affected.

By providing a perfect breeding place for flies, these insects will avoid less enticing breeding places which they would have normally resorted to if the fly receptacle were not provided. In this manner, it will be readily appreciated that a sharp reduction in the over-all number of flies within a given area may be obtained in a most advantageous and effective manner.

It is to be understood that it is not absolutely essential to utilize the specific container shown below the fly receptacle, nor is it absolutely necessary to use oil or other solutions in the container. In this respect, it should be borne in mind that the primary function of the fly receptacle is to provide an enticing breeding place for adult flies so that the resulting larvae may be trapped when they fall from the fly receptacle and subsequently destroyed. Although the barrel shown and the oil or solution mentioned effect, in conjunction with the specific fly receptacle, a most efficient system for the destruction of larvae, any simple container can be used, with satisfactory results.

Since numerous modifications and changes will readily occur to those skilled in the art, it is not desired to limit the invention to the exact construction shown and described, and accordingly, all suitable modifications and equivalents may be resorted to, falling within the scope of the appended claim.

What is claimed as new is as follows:

A device for destroying fly larvae comprising an open top receptacle having a quantity of larvae destroying solution therein, a pair of rods extending across the top of the receptacle, a housing for containing fly larvae comprising a bottom resting on said rods and sides spaced above said bottom to provide for the escape of the larvae out of said housing into said receptacle, and a top for said housing having a corner pivoted to said housing for horizontal swinging of the top to open the top of the housing for deposit of larvae feeding material in said housing.

References Cited in the file of this patent

UNITED STATES PATENTS

| 581,191 | Bell | Apr. 20, 1897 |
| 708,696 | Davis | Sept. 9, 1902 |
| 718,666 | Shoemaker | Jan. 20, 1903 |
| 1,048,971 | Hunt | Dec. 31, 1912 |
| 1,681,063 | Steele | Aug. 14, 1928 |
| 2,694,879 | Stoll | Nov. 23, 1954 |

FOREIGN PATENTS

| 7,344 | Great Britain | 1915 |